United States Patent [19]

Höfler et al.

[11] Patent Number: 4,519,242
[45] Date of Patent: May 28, 1985

[54] AUTOMATIC GEAR TESTING APPARATUS

[75] Inventors: Willy Höfler, Fridtjof-Nansen-Strasse 35, D-7500 Karlsruhe 41; Peter Golder, Ettlingen, both of Fed. Rep. of Germany

[73] Assignee: Willy Höfler, Karlsruhe, Fed. Rep. of Germany

[21] Appl. No.: 493,531

[22] Filed: May 11, 1983

[30] Foreign Application Priority Data

Jul. 3, 1982 [DE] Fed. Rep. of Germany ....... 3224980

[51] Int. Cl.³ ............................................. G01M 13/02
[52] U.S. Cl. ................................... 73/162; 33/179.5 R
[58] Field of Search ..................... 73/162; 33/179.5 R, 33/179.5 A, 179.5 D, 179.5 E

[56] References Cited

U.S. PATENT DOCUMENTS 2,938,275 5/1960 Hofler ............................ 33/179.5 R

FOREIGN PATENT DOCUMENTS

1423570 9/1955 Fed. Rep. of Germany .

Primary Examiner—Steven L. Stephan
Assistant Examiner—Patrick Scanlon
Attorney, Agent, or Firm—Edwin E. Greigg

[57] ABSTRACT

An automatic testing apparatus is proposed for testing the circular spacing of gears and, in a further development, for simultaneously testing the deviations in gear concentricity, tooth thickness and tooth gap. The testing of circular spacing is accomplished in only one revolution simultaneously for both the right and left tooth flanks of the gear, and the measurement values thus obtained can be used as well for ascertaining the deviations in gear concentricity, tooth thickness and tooth gaps.

8 Claims, 11 Drawing Figures

AUTOMATIC GEAR TESTING APPARATUS

BACKGROUND OF THE INVENTION

The invention relates to an automatic testing apparatus for testing the circular spacing of gears, in which during the testing operation the gear is caused to rotate continuously in one direction by its own power source, and a slide on the frame of the apparatus is displaceable by a drive mechanism substantially radially toward the gear and back away from it for performing the individual testing operations. The slide has two measuring feelers supported pivotably on it, which are movable along with the gear counter to spring force and which cooperate with preferably inductive transducers. The measuring feelers each point toward the same flank (right or left) of two adjacent teeth in the vicinity of the pitch circle of the gear. Means are provided for applying the measuring feelers, under spring force, to the tooth flanks after the feelers have been driven into the tooth gaps and for moving them away from the tooth flanks, counter to spring force, after the testing operation has been performed. The first measuring feeler is embodied as a reference feeler and is connected with switching means by which, at a predetermined pivoted position of this feeler, the pickup or emission of a measurement value from the second feeler is brought about on the one hand and by which on the other hand the retraction of the measuring feelers out of the teeth and their re-insertion, retarded in an adjustable manner, into the teeth are controllable by means of the appropriate switching of the slide drive. The invention furthermore relates to a method for testing the circular spacing of continuously rotating gears and, in a further development, to a method for measuring deviations in gear concentricity, in tooth thickness and in tooth gaps for continuously rotating gears.

The known testing apparatuses for circular spacing, which permit relative testing by means of a comparison of sequentially ascertained measurement values, are suitable both for large gears to be tested directly on the gear cutting machine and for small gears which are tested on a measuring machine, to which end such testing apparatuses are usually transportable. The testing is effected dynamically because of the continuously rotating gear.

The two measuring feelers mentioned above are located on a slide, by means of which they can be inserted into the gear teeth against a fixed stop and then retracted once again after the measurement operation has been performed. For the testing operation per se, the measuring feelers are positioned approximately with respect to the pitch circle diameter, being placed precisely on a common circular path; in practice, this is accomplished by making the measuring feeler just touch one flank of the gear tooth. The feelers are also positioned such that for the measuring operation they rest first on the left-hand tooth flanks, for instance, and when the feelers first engage these flanks, the transducers of these feelers are balanced at zero.

For a test object which rotates continuously, the measuring feelers are inserted one after another into sequential tooth gaps. After contacting the respective tooth flanks, the feelers follow the test object for a certain distance, until the reference feeler again attains the value of zero. This causes the measurement value transfer, or the emission of the value corresponding to the deviation in spacing, at the transducer of the second feeler and also causes the retraction of the feelers from the teeth which then occurs. The automatic control of this insertion and retraction of the feelers from the teeth is known and will accordingly not be described in detail here.

Once the gear has made one revolution, so that the feelers have come into contact with all the left flanks of the teeth, then the measuring feelers are again placed on a common circular path against the right tooth flanks of adjacent teeth, and the transducers connected with the feelers are again set to zero. The spacing is then tested via the right flanks, with the gear now revolving in the opposite direction.

To prevent the measuring feelers from scraping the tooth flanks or colliding with the teeth during their insertion into and retraction out of the teeth, it is conventionally provided that for shifting them from one tooth gap to the next, the feelers are raised by switching means from the flanks which they have scanned or which they are about to scan.

The known testing unit has the disadvantage that two complete gear revolutions are required to detect spacing deviations at the left and right tooth flanks, and between the two revolutions the measuring feelers also have to be changed over from one tooth flank to the other. This means that a great deal of time and expense must be expended, a situation which in testing on the gear machine itself is further increased quite substantially because a gear cutting machine with a very high hourly output cannot then be used for production during the testing operation.

In order to measure the deviations in gear concentricity, tooth thickness and tooth gaps—which become of interest if the gear is found acceptable in terms of spacing—a further testing unit is also required. In order to measure deviations in tooth gaps and gear concentricity, a ball-like measuring feeler is inserted into each tooth gap of the continuously revolving test object, and the depth of insertion in each case is measured; this permits a conclusion to be made as to whether there are deviations from one tooth gap to another, and in the final analysis it permits the deviation in concentricity to be ascertained. For the deviations in tooth thickness, one forked measuring feeler after another is placed against each tooth of the gear, and here again the insertion depth, or the deviation in the insertion depth from an initially adjusted zero setting, is ascertained. Thus at least one further revolution of the gear, and a separate testing unit, are required to make these last three measurements, which still further increases the time and expense required for gear testing.

OBJECT AND SUMMARY OF THE INVENTION

It is the object of the invention to modify and improve the known apparatus and the associated method for testing gear spacing in such a manner that the testing of the circular spacing is effected for both the right and left flanks of the teeth, so that the testing time can be reduced to half that required by the known apparatus.

In a further development of the invention, an apparatus is proposed for measuring deviations in gear concentricity, tooth thickness and tooth gaps simultaneously, so that a second unit for that purpose can be dispensed with.

Depending on conditions, it is also proposed that the three last-mentioned values be ascertained simultaneously with the testing of gear spacing, making it possible to dispense with a separate revolution of the gear for that purpose and thus allowing the measuring operation to be attained in a simple manner and at relatively little expense.

For testing gear spacing on a testing unit of the type discussed at the outset above, a third measuring feeler which cooperates with a preferably inductive transducer is disposed on the slide in the vicinity of the pitch circle of the gear, being positioned for that purpose for the (left or right) edge opposite the first or second measuring feeler, and in that the third feeler is likewise controlled in its mode of operation by the reference feeler. By means of this provision, according to the invention, it is possible to scan the tooth flank opposite the first or second feeler, and to evaluate the measurement value thus ascertained for the purpose of ascertaining the spacing of the tooth flanks located opposite the first and second measuring feelers. It is thereby possible, in a single gear revolution, to measure spacing deviations for both the left and right tooth flanks, thus cutting the testing time in half when compared with the conventional apparatus and also reducing the cost substantially, especially for the case where the gear testing is being performed on the gear cutting machine.

According to a first embodiment of the invention, it is proposed that the third measuring feeler be disposed between the first and second measuring feelers. By means of this third feeler, not only the deviation in thickness of the tooth associated with it can be ascertained in combination with the feeler located on the other side of this tooth, but also the deviation in tooth gap of the tooth gap associated with this third feeler can be ascertained in combination with the feeler located on the other side of the tooth gap.

A memory and computer unit is also connected with the feelers; the tooth gap deviation of one measurement step can be stored in memory and then added with the tooth thickness deviation of the next measuring step, resulting in a value for the spacing deviation for the left or right flanks which then are located opposite the first and second feelers. Thus in one measuring operation, the tooth thicknesses and the widths of the tooth gaps, or their deviations, are ascertained simultaneously, so that separate measuring operations are not required for each measurement. Furthermore, the values thus ascertained are additionally used for determining spacing deviations for the flanks of adjacent teeth located opposite the first and second feelers, again not requiring a separate measurement operation. This particular purpose is served by a computer unit, the mode of operation of which will be described in detail below.

In accordance with a further embodiment, it is provided that during the measuring operation, the third measuring feeler is located outside the area encompassed by the first and second measuring feelers but within the tooth gap associated with one of the first two measuring feelers and in contact with the tooth edge located opposite that measuring feeler, and that the other measuring feeler is disposed on a second slide, which is displaceable on the first slide substantially at a tangent to the gear, in such a manner that for an individual measuring operation this other one of the first two measuring feelers can be shifted from the one tooth flank associated with its tooth gap to the other tooth flank. This shiftable measuring feeler may be the reference feeler, and it may have a separate zero passage for the pickup of a measurement value for each of the two shift positions.

In this embodiment, therefore, two measuring feelers are located in one tooth gap, while in an adjacent tooth gap only one measuring feeler is provided, which simultaneously is the reference feeler. In a first measuring position, in which the reference feeler is resting by way of example on a left tooth flank while the further measuring feeler is resting on the left tooth flank of the next tooth gap, the spacing, or deviation in spacing, of these left tooth edges is ascertained using these two feelers. After shifting the first measuring feeler to the other tooth flank, the spacing deviation for the right tooth flanks is then ascertained with the other measuring feeler resting on the next tooth edge. It may be provided that two different zero passages can be established for the shiftable feeler, dependent on the rotational speed or the circumferential speed in the vicinity of the pitch circle of the gear to be tested, such that, given the fact that the test object (that is, the gear to be tested) is revolving continuously, the shiftable measuring feeler emits a signal at two of its positions dependent on its switchover position, with which signal the spacing deviation of the left tooth flanks, on the one hand, and the spacing deviation of the right tooth flanks, on the other, is picked up.

The method according to the invention is intended generally for testing the circular spacing of continuously revolving gears, whereby with measuring feelers spacing deviations are ascertained via the same (left or right) tooth flanks of adjacent teeth in the vicinity of the pitch circle as compared with a zero balance of the measuring feelers effected during a first measurement operation, stored in memory and then emitted, and where the measuring feelers are periodically retracted from the teeth in a controlled manner between the measuring operations and then reinserted into the teeth, having been shifted by one spacing. According to the invention the method provides that the spacing deviations of both the right and the left flanks of adjacent tooth gaps, as well as deviations in tooth thickness and deviations in tooth gaps, are all measured in a single measuring operation.

Specifically, the use of a third measuring feeler in accordance with the invention provides for using the adjacent measuring feelers as well, of scanning the respective tooth gap width and the tooth thickness of the associated tooth at the same time and from this measuring operation to derive the corresponding measurement values without requiring a separate measuring operation to do so. Thus virtually all the values of interest in testing gears are ascertained in a single revolution.

In a further embodiment of the invention which is generally intended for measuring the deviations in gear concentricity of continuously rotating gears in which the tooth gaps or the tooth thickness are scanned by measuring feelers, and the deviations are ascertained in comparison with a zero balance of the measuring feelers effected in a first measuring operation and stored in memory and then emitted, where the measuring feelers are periodically retracted from the teeth in a controlled manner between the measuring operations and then reinserted into them, having been shifted by one spacing, an independent measuring feeler is brought into contact on each side of one tooth gap or of one tooth in the vicinity of the pitch circle, and that with the aid of a computer the deviations resulting in the circumferential direction of the gear between the two measuring feelers associated with that tooth gap, or that tooth and the zero balance, are added, then divided by the tangent of the engagement angle and finally divided in half, before the emission of a measurement value is effected; a feeler deviation resulting from an excessive dimension on the part of the tooth gap or the tooth is further processed as a positive value for the tooth gap deviation, gear concentricity deviation, or tooth thickness deviation.

As a result of the method according to the invention, it is no longer necessary to monitor the gear with a separate appliance in order to measure deviations in gear concentricity. Quite the contrary; this measuring operation can be accomplished in a single operation where all that needs to be done is for the values furnished by the measuring feelers to be processed further in an appropriate manner; the measurement values can be used of either of two measuring feelers disposed on a common tooth gap or of two measuring feelers between them encompassing one tooth. In accordance with what has been described above and what is known in gear measuring technology, care is taken that an excessive dimension on the part of either a tooth gap or a tooth thickness will appear as a positive value.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
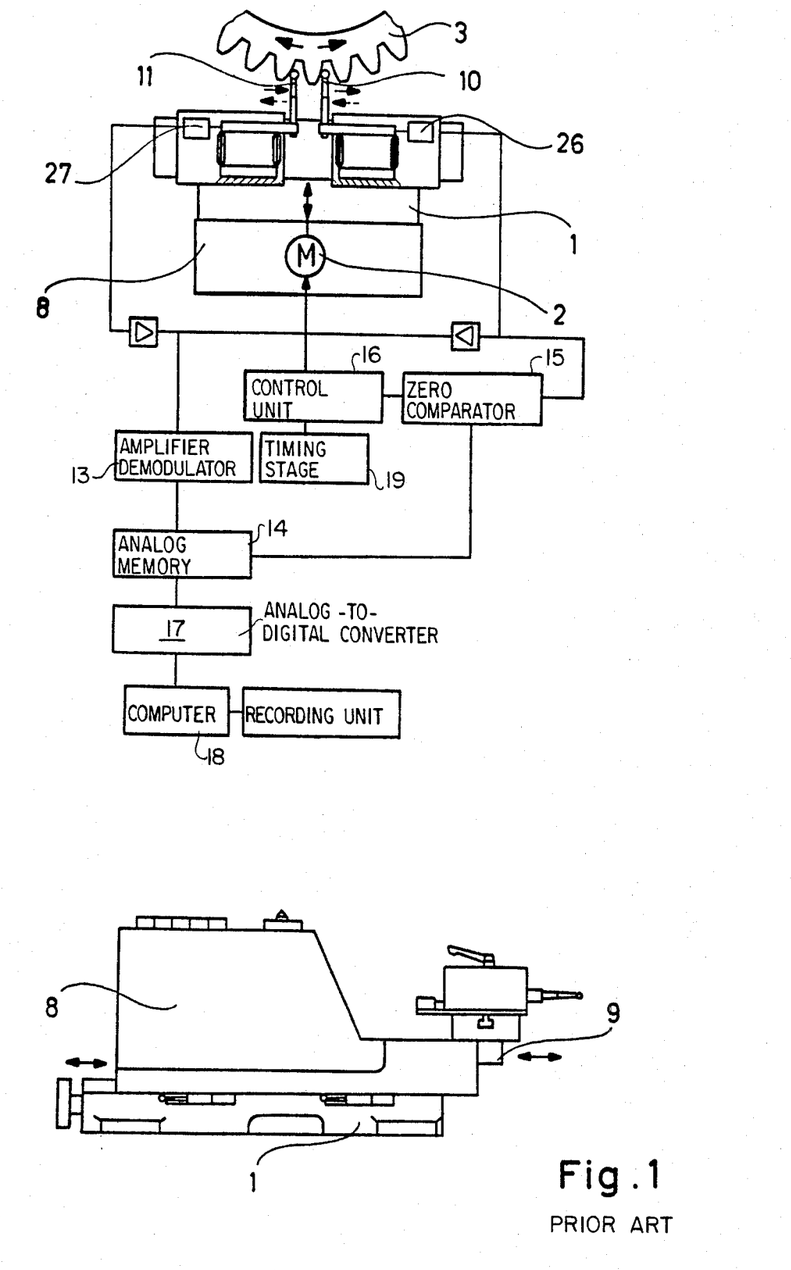
FIG. 1 is a schematic illustration showing a testing apparatus for testing spacing, shown in simplified form with a block circuit diagram and partially cut in a side view.

As shown in FIG. 1, the testing apparatus for testing spacing has a frame 1, with respect to which the gear 3 to be tested is supported such that it can revolve continuously with the aid of its own drive mechanism, not shown. On the frame 1 via a housing 8, a slide 9 is displaceable radially to the gear 3 via a drive means 2. Measuring feelers 10 and 11 are pivotably supported on the slide 9, and each is connected in a manner not shown with a respective inductive transducer 26, 27. The housing 8 contains the drive means 2 already mentioned for the movement back and forth of the slide 9 in order to insert the measuring feelers 10 and 11 into the gear teeth and for retracting them back out again. The housing also contains the means for processing the measurement values furnished by the measuring feelers 10 and 11; as a rule, a unit for emitting the results of measurement is connected to the housing 8, for instance in the form of a recording instrument.

As may be seen from FIG. 1, the voltages generated in the measuring transducers 26, 27 are carried via adapting amplifiers 12 to a control and evaluation or recording unit, in that a direct voltage which is proportional to the measurement value is generated in the amplifier/demodulator 13. Following a certain amount of deflection on the part of a feeler, the storage of the direct voltage in the analog memory 14 is effected by means of the zero comparator, and the return travel of the measuring slide is simultaneously effected via the control unit 16. The signal present in the analog memory is digitalized in the analog-to-digital converter 17 and is stored in this form for later evaluation in the computer 18. After a period of time which can be prespecified via the timing circuit 19, the above-described measurement operation is started once more, until completing an operation for the programmed number of teeth.

The mode of operation of the testing apparatus will now be explained in greater detail, referring to FIGS. 2 and 3 which again show the gear 3, the apparatus housing 8 in simplified form, the slide 9 which is displaceable on it radially with respect to the gear, and the measuring feelers 10 and 11 pivotably disposed on the slide. The measuring feelers 10 and 11 are pivotably supported via roller bearings 24, 25 on blocks 22, 23 which can be adjusted and fixed in position via screw connections 20, 21; the feelers then transmit their pivoting paths to inductive transducers 26, 27.

Figures 2, 3:
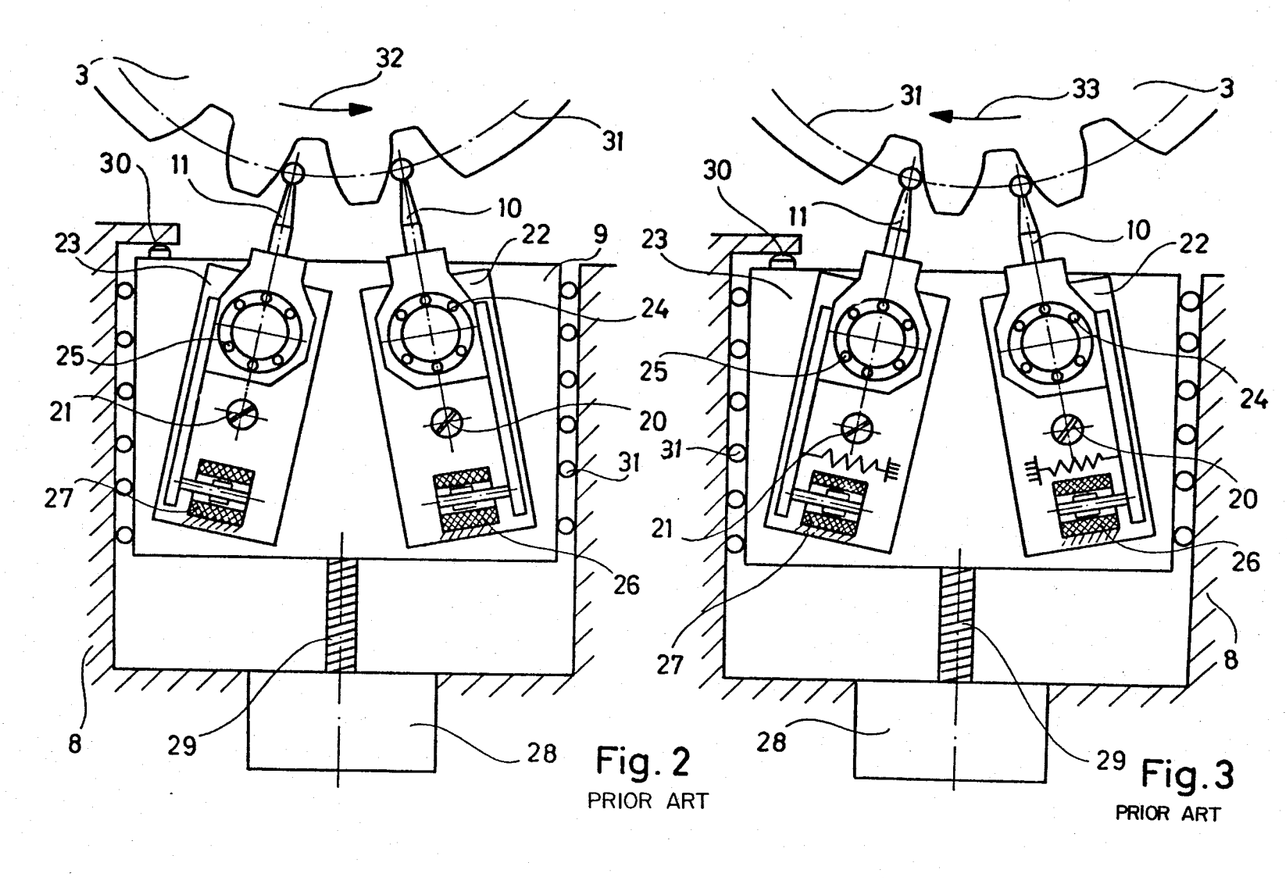
FIGS. 2 and 3 show the mode of operation of the testing apparatus of FIG. 1 via left and right flanks of a gear, seen in a schematic illustration.

The slide 9 is movable toward and away from the gear 3 in the radial direction by means of a servomotor 28 and a spindle 29 driven by it. The terminal movement position, as seen in the direction toward the gear 3, is determined with respect to the housing 8 by a stop 30. The mobility of the slide 9 with respect to the housing 8 may be equally well assured via a roller bearing 31.

With the aid of this known testing apparatus, the testing of relative spacing is effected in the following manner:

As shown in FIG. 2, the feelers 10 and 11 are made to contact the left tooth flanks (that is, on the left as seen from the apparatus) of the gear 3 in the vicinity of the pitch circle 31 inside adjacent tooth gaps, and their inductive transducers 26, 27 are there balanced to zero to establish the measuring position.

In a measuring operation in which the gear revolves counterclockwise (in this instance), as indicated by the arrow 32, the measuring feeler 11 which acts as the reference feeler passes through the zero position, which causes the measurement value of the feeler 10 to be picked up or emitted. After this action has taken place, the reference feeler 11 causes the lifting of the feelers 10 and 11 from the tooth flanks and the return travel of the slide 9 by means of the spindle drive 28, 29, so that the feelers travel out of the tooth gaps. The gear 3 continues its movement as indicated by the arrow 32, until the feelers 10 and 11 come to a stop before the next subsequent gaps, whereupon the slide 9 is again advanced by the drive means 28, 29 to rest against the stop 30. The feelers 10 and 11 are thereupon placed against the next subsequent left flanks and then carried along for some distance by the further rotation of the gear 3 until such time as the reference feeler 11 passes through its preset zero position and at that instant brings about the emission of a measurement value from the measuring feeler 10. The outward movement of the feelers is thereupon repeated, followed by another insertion movement into the next tooth gap, as described above.

In order to measure the right-hand tooth flanks, as shown in FIG. 3, the measuring feelers 10 and 11 must be positioned against these tooth flanks in the vicinity of the pitch circle 31 and balanced to zero. Furthermore, the gear 3 now has to revolve in the opposite direction, as indicated by the arrow 33. The measurement operations then take their course in the manner corresponding to what is shown in FIG. 2 but in the opposite direction.

In FIGS. 2 and 3, the directions of rotation 32 and 33 are arranged such that the measurement feelers 10 and 11 are carried along by the gear 3 counter to a spring force. However, it is equally possible for the directions of rotation to be the reverse of what is shown, and for the measuring feelers which are subject to a pre-stressed spring force to follow along the tooth flanks to be tested as a result of this pre-stressing.

Returning to FIG. 1, it should furthermore be noted concerning this known testing apparatus that it (that is, the positions 8 and 9) can also be attached directly to a gear cutting machine, on which the gear is still secured while it is being cut, so that the testing operations described in connection with FIGS. 2 and 3 can take place with the gear cutting machine serving as the drive means for the gear which is to be tested.

Figure 4:
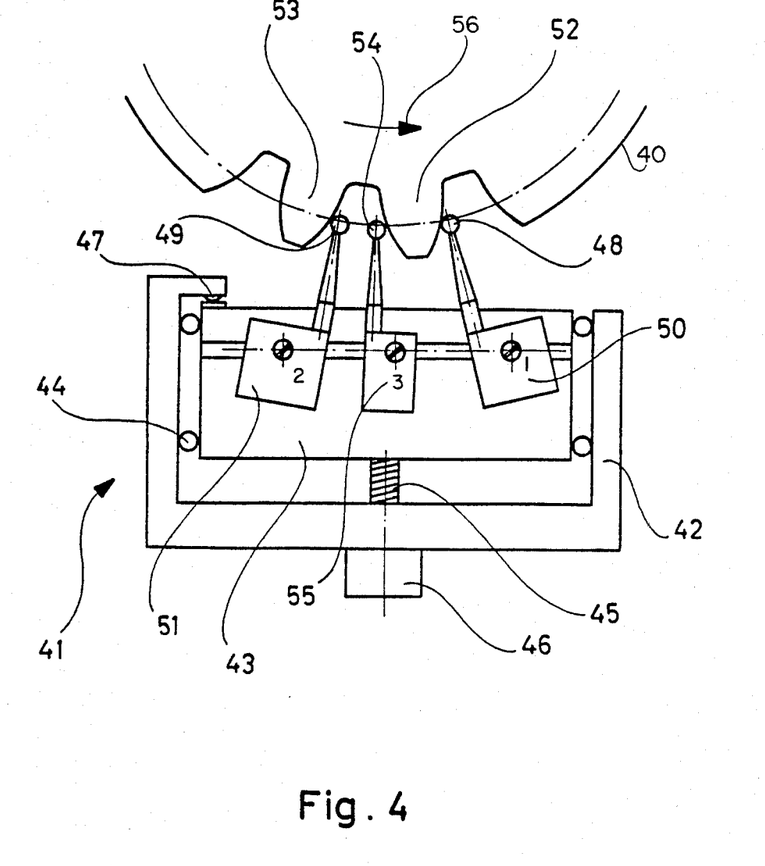
FIG. 4 shows a first form of embodiment of a spacing testing unit apparatus in accordance with the invention, seen in a schematic illustration corresponding to FIGS. 2 and 3.

FIG. 4 shows a first form of embodiment of the novel testing apparatus, illustrated in a manner which substantially corresponds to FIGS. 2 and 3.

Here again, the test object is a gear, in this case a gear 40, opposite which a measuring apparatus generally identified as 41 is disposed. In a housing 42 via roller guides 44, a slide 43 is displaceable radially relative to the test object with the aid of a spindle drive 45, 46. The forward position of the slide 43 is defined by a stop 47, which may be embodied as adjustable.

In a manner comparable to what is shown in FIGS. 1–3, two measuring feelers 48 and 49 are again disposed on the slide 43; they are connected with inductive transducers 50, 51 which are no longer shown in detail, and in the present instance they rest on the left flanks of adjacent teeth 52, 53 of the test object 40.

In addition, a third measuring feeler 54 having an inductive transducer 55 embodied in the described manner is disposed on the slide 43 between the measuring feelers 48 and 49, in such a manner that with respect to the tooth gap associated with the measuring feeler 49, the third feeler 54 rests on the opposite flank of the tooth 52. With the aid of this third feeler it now becomes possible simultaneously to ascertain both deviations in the spacing of the right tooth flank (that is, the right-hand flank as seen in FIG. 4) and deviations in tooth gaps and tooth thickness during a single revolution of the test object 40. Finally, it is also possible to ascertain the deviation in gear concentricity; however, this will be explained in detail later, referring to FIGS. 6–9.

The course of the measurement operation, using the apparatus shown in FIG. 4, is again such that in the position shown by way of example, all three measuring feelers 48, 49, 54 are balanced to zero in a first inserted position with respect to the test object 40; the measuring feeler 48 serves as the "zero feeler". For the next measurement step, the feelers 48, 49, 54 are now retracted from the teeth with the aid of the slide 43; the test object revolves further as indicated by the arrow 56, and then, after a partial indexing, the feelers are reinserted in the teeth with the aid of the slide. There the feelers are carried along counter to spring force by the tooth flanks then adjacent to them, or they follow these flanks under the influence of a spring force acting upon them, until such time as the feeler 48 passes through its zero position, which causes the emission of the measurement value for the feelers 49, 54 and at the same time initiates the return travel and the retarded resumption of forward travel on the part of the slide 43. In a measurement operation of this kind, the tooth thickness deviation is determined tooth for tooth between the feelers 48, 54, while the deviation in tooth gap is likewise determined, tooth gap for tooth gap, between the feelers 49, 54. Finally, however, it is possible to ascertain not only the spacing deviation of the left-hand tooth flanks (as seen in FIG. 4), but also, with the aid of the feeler 54, the spacing deviation of the right-hand tooth flanks. To accomplish this, the tooth gap deviation between the teeth 52, 53 (for example) is ascertained in a first measurement step and is stored in memory; then in the next measuring step, by addition of the tooth thickness deviation of the tooth 53, the spacing deviation of the right flanks of the teeth 52, 53 can be arrived at. This process is then repeated over the entire circumference of the test object 40; the gap deviations of two teeth being scanned at a given time by the feelers 49, 54 are added to the tooth thickness deviation of the tooth being scanned at that time by the feeler 49.

Thus it is also possible in the described manner, in one measurement revolution of the test object 40, simultaneously to ascertain the following deviations, step by step, each time the zero feeler 48 pases through its zero possition: via the feelers 49, 54, the deviation in tooth gap; via the feelers 54, 48, the deviation in tooth thickness; and with the aid of the feeler 54 and the computer connected with the measuring apparatus, the deviation in spacing of the tooth flanks located opposite the feelers 48, 49.

Figure 5:
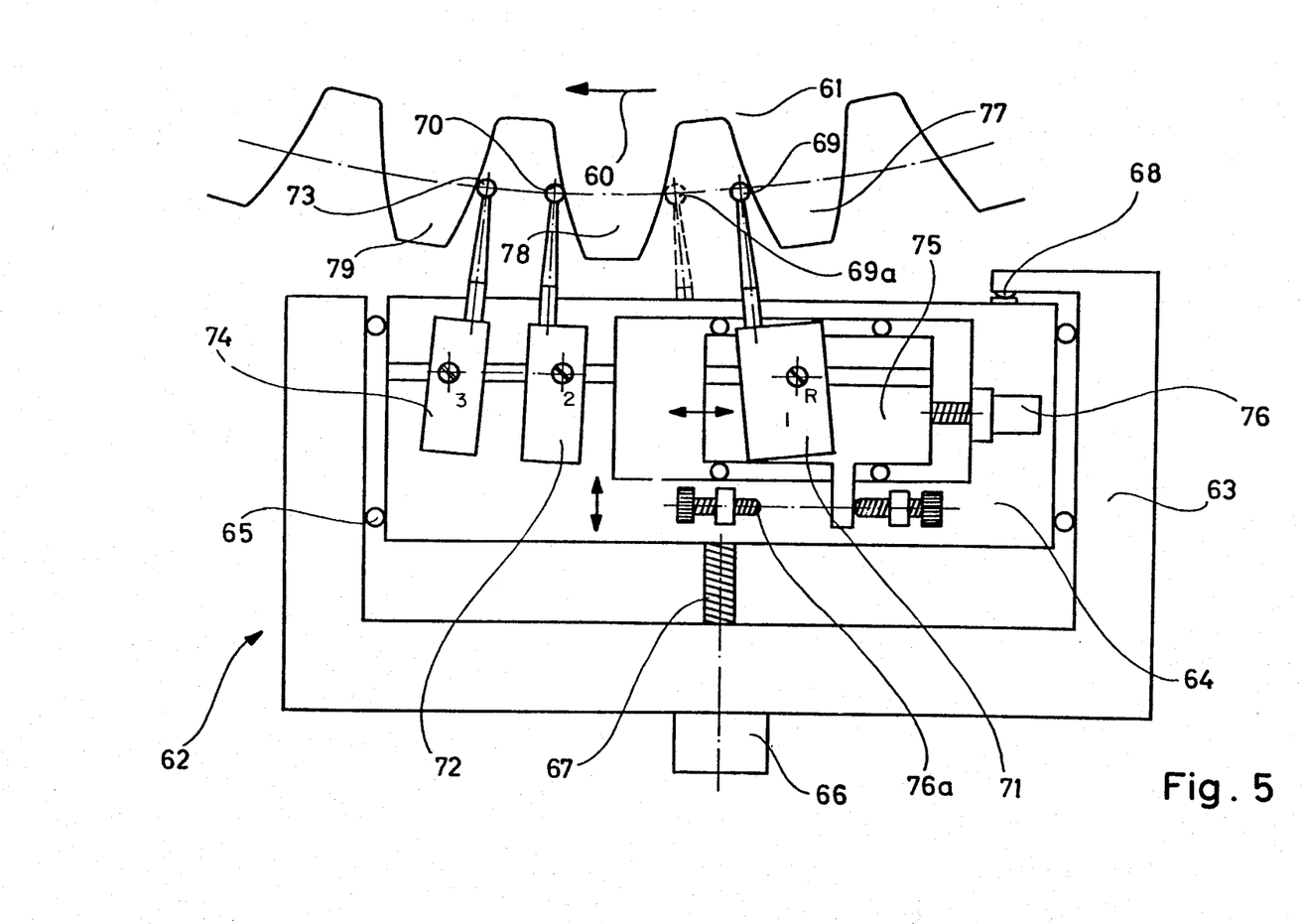
FIG. 5 shows another form of embodiment of the spacing testing apparatus according to the invention, again in an illustration corresponding to FIGS. 2 and 3.

FIG. 5 shows a modification of the measuring apparatus according to the invention. Again, there is a test object 61 rotating continuously in the direction indicated by the arrow 60. A measuring apparatus generally identified by reference numeral 62 is located opposite the test object 61. It has a frame 63, in which a slide 64 is displaceable radially relative to the test object via bearings 65 with the aid of a drive mechanism which comprises a motor 66 and a spindle 67 driven by the motor. The forward terminal postion of the slide 64, as in the previous examples, is determined by a stop 68, which depending upon the characteristics of the test object 61 may be adjustable.

To the extent that it is comparable with the prior art, there are first two feelers 69, 70 disposed on the slide 64, which are connected with inductive transducers 71, 72 in the manner described earlier. In this instance, the feeler 69 is the reference feeler, or in other words the feeler which for each measurement step controls the emission of a measuring value and the movements of the slide 64.

In addition, the slide 64 also has a third feeler 73, disposed outside the area of the feelers 69, 70, which has an inductive transducer 74, which rests on the other tooth flank in the same tooth gap associated with the feeler 70. Finally, the reference feeler 69 is displaceable transversely on the slide 64, with the aid of a transverse slide 75 and a drive mechanism 76, at a tangent to the test object 61 by approximately the dimension of one tooth gap, to which end there is an adjustable stop 76a for at least one indexing position.

The measurement operation accomplished with the apparatus shown in FIG. 5 is effected as follows:

In a first step, the measuring feelers 69, 70, 73 are inserted into the teeth in the illustrated manner, and their inductive transducers are balanced to zero. Furthermore, taking into consideration the circumferential speed of the test object 61 and the indexing speed of the transverse slide 75, one further zero balancing is performed for the feeler 69 in its position 69a in which it has been shifted to the other tooth flank.

The individual steps in measurement are now effected such that the feelers are inserted between the teeth 77, 78, 79 in the manner shown in FIG. 5. If the feeler 69 passes through its first zero position shown, then the spacing deviation of the right flanks of the teeth 77, 78 is ascertained with the aid of the feelers 69, 70, and it is simultaneously possible to ascertain the deviation in tooth gap width between the teeth 78, 79 with the aid of the feelers 70, 73. If the feeler 69 has passed through its first zero position, then its shift over to the left flank of the tooth 78 is effected with the aid of the transverse slide 75; there, upon another occurrence of a zero passage by the feeler 69 at its position 69a, the tooth thickness deviation of the tooth 78 can be determined together with the feeler 70. Naturally the opportunity also exists of coupling the deviations in tooth gaps between the teeth 78, 79 to the zero passage of the feeler 69 in its shifted position 69a indicated by dashed lines.

Furthermore, the spacing deviations for both the left and the right tooth flanks are also determined in that upon the zero passage of the reference feeler 69 in its position indicated by solid lines, together with the feeler 70, the spacing deviations of the right tooth flanks are picked up, while upon the zero passage of the feeler 69 in the position indicated as 69a, together with the feeler 73, the spacing deviations of the left tooth flanks are emitted.

Figure 4A:
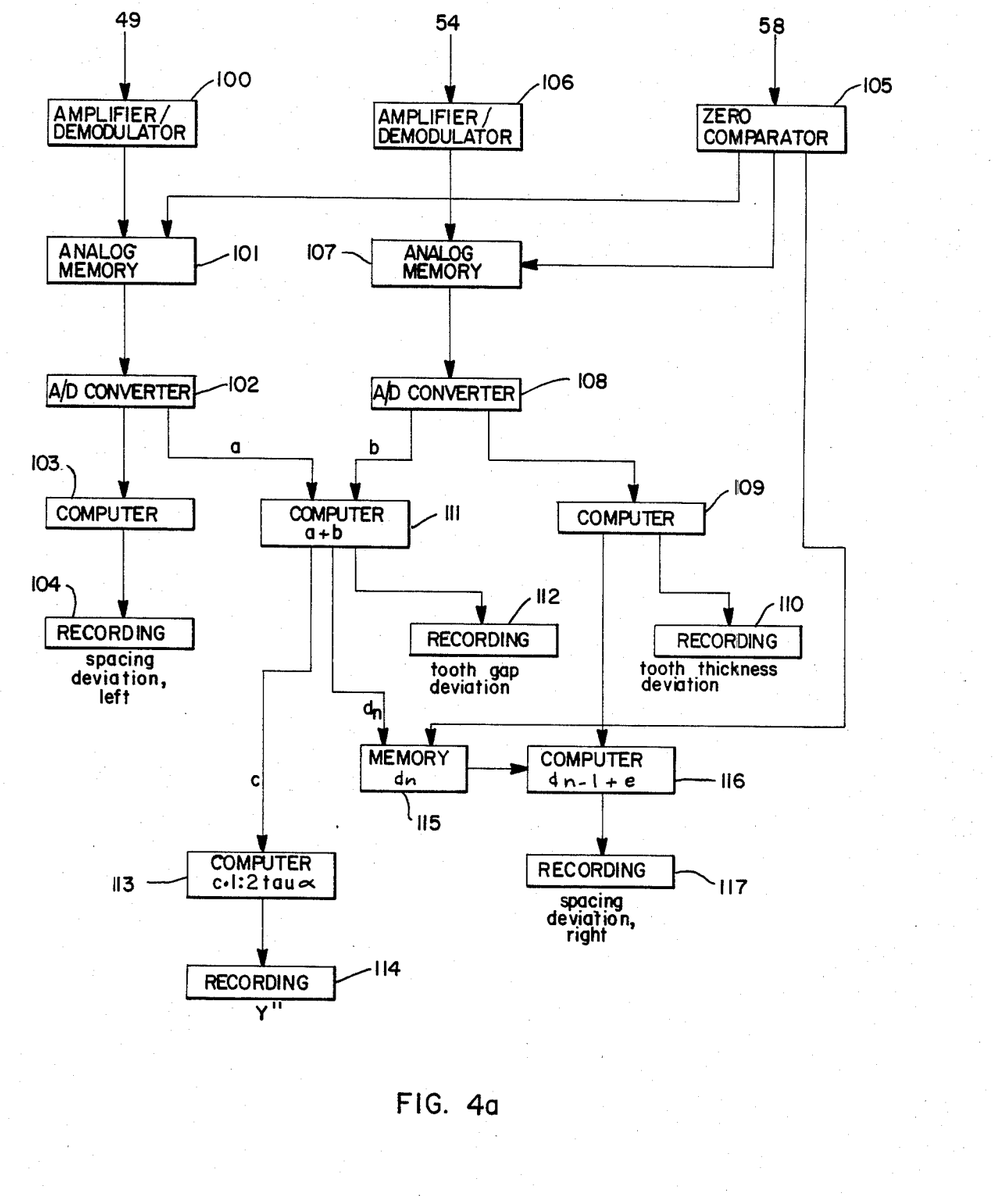
FIG. 4a is a schematic illustration of a circuit diagram corresponding to FIG. 1 and FIG. 4.
Figure 5A:
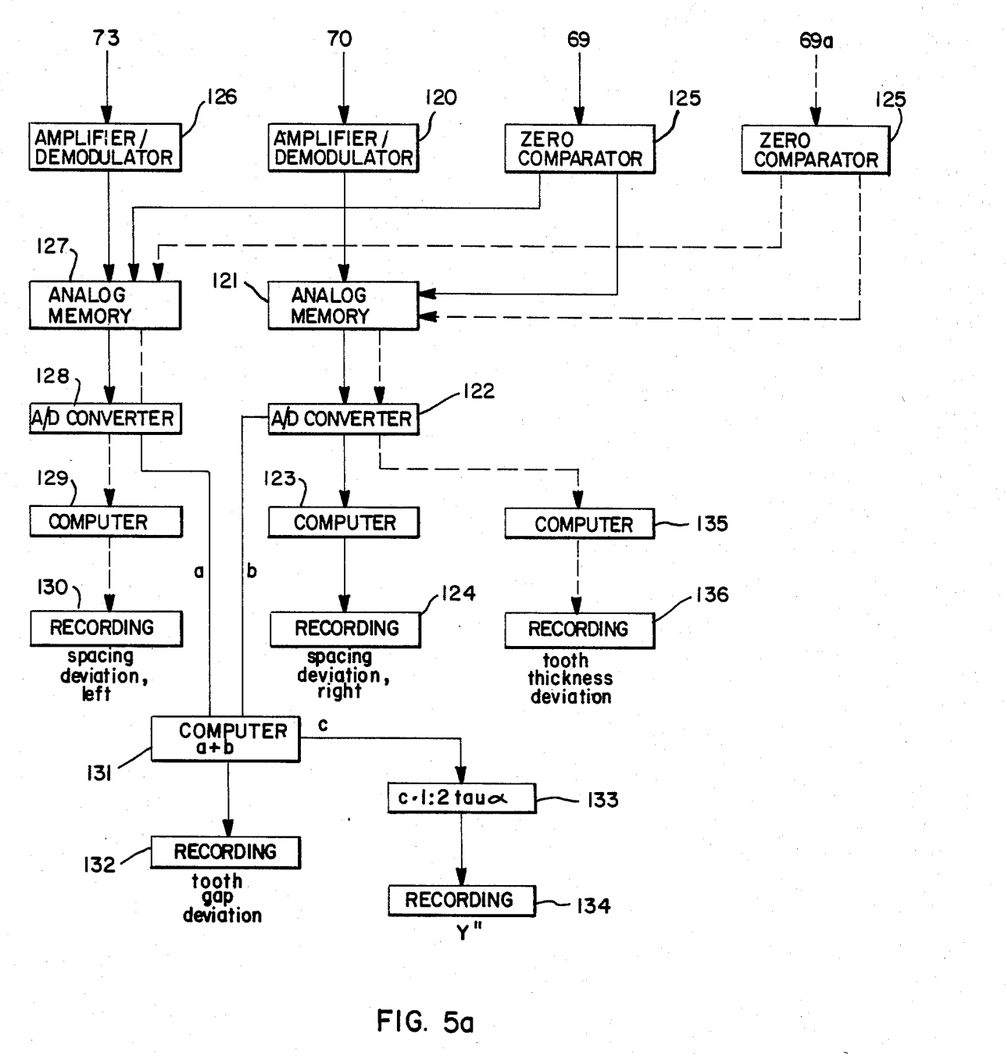
FIG. 5a is a schematic illustration of circuit diagram corresponding to FIG. 1 and FIG. 5.

Referring now to FIGS. 4a and 5a, reference is made to circuit diagram based on the electrical values furnished by the measuring feelers 49, 54 and 58. The circuit that directly follows the feeler 49 corresponds to that shown in FIG. 1. Thus the measuring feeler 49 is followed by an amplifier/demodulator 100, an analog memory 101, then an A/D converter 102, a computer 103 and finally a recording device 104. The analog memory 101 is triggered by the zero compensator 105 connected to the feeler 58. This means that the zero comparator issues the command of when the measured value instantaneously furnished by the feeler 49 is to be further processed and emitted. The result, upon recording 104, is the deviation in spacing of the left tooth flanks.

The measuring feelers of the measuring apparatus are balanced to zero upon a first encounter with the gear to be tested, and according to FIG. 4, the measuring feeler 58, during the individual measuring steps, gives the command to emit the measuring values each time it passes through this zero position, which is precisely the function of the zero comparator 105. Thus if the measuring feelers 58 passes through the zero position, then this, together with the zero comparator 105, causes the zero comparator to give the command to emit the measured values.

In comparison with the prior art described with reference to FIG. 1, there is now, according to FIGS. 4 and 4a, a further measuring feeler 54. This measuring feeler 54 is followed first by the same measuring system as that following the measuring feeler 49—that is, an amplifier/demodulator 106, an analog memory 107, an A/D converter 108, a computer 109 and a recording device 110, which in terms of what is shown in FIG. 4a emits the deviation in tooth thickness with respect to the tooth 52.

The A/D converters 102 and 108 are also followed by a computer 111, which adds up the measured values furnished by the measuring feelers 49 and 54. The thus added measured values are sent to a recording unit 112, which emits the deviation in tooth gap between the teeth 52 and 53.

The measured values furnished by the A/D converters 102 and 108 also correspond to the values $X_r$ And $X_1$. As described with reference to FIGS. 6–9, the deviation in gear concentricity $Y''$ can be calculated from these values, which is done with the aid of the computer 113, which follows the computer 111 and is followed in turn by a recording unit 114 for emitting the value $Y''$. As is described in detail with reference to FIGS. 6–9, the value $Y''$ results when the sum of $X_r$ and $X_1$ is divided by the value $2 \tan \alpha$.

As described in conjunction with FIG. 4a, the spacing deviation for the right tooth flanks is the result of adding to the tooth thickness deviation (110) of one measuring step the tooth gap deviation of a preceding measuring step. This means that the tooth gap deviation of the preceding measuring step must be stored in a memory 115, so that one measuring step later it can be added up with the measured tooth thickness deviation; this takes place in the computer 116. From the computer 116, the sum ascertained is sent in turn to a recording device 117, which emits the spacing deviation for the right tooth flanks.

In order to make it clear, with reference to the memory 115, that when triggered by the zero comparator 105 this memory 115 always emits the value of the tooth gap deviation of the preceding measuring step, the stored value d is provided with the subscript n. Here, n stands for the actual measuring step being taken at a particular time, while the subscript "n−1" means that the value of the preceding measuring step is always emitted.

As is apparent, the circuit for emitting the measured values, arranged as shown in FIG. 4a, is made up of generally known switching means, such as those already shown and explained in conjunction with FIG. 1. This also applies to the memory 115, for it is a generally known switching element, which both stores a value for that actual time and simultaneously emits a preceding value.

In the circuit diagram of FIG. 5a relating to the subject of FIG. 5, a memory 115 is not even necessary. Instead, it is more or less replaced by the shifting of the measuring feeler 69 into the position 69a. In FIG. 5a, the feeler 70 is again followed, in the manner shown for FIG. 1, by an amplifier/demodulator 120, an analog memory 121, and A/D converter 122, a computer 123 and a recording unit 124, with which the spacing deviation for the right tooth flanks is emitted, when the analog memory 121 is triggered by the zero comparator 125 of the measuring feeler 69.

At the same time, the feeler 73 is correspondingly followed by an amplifier/demodulator 126, an analog memory 127, and A/D converter 128, a computer 129 and a recording unit 130, which emits the spacing deviation of the left tooth flanks whenever the analog memory 127 is triggered by the feeler 69 in its position 69a.

By adding up the values of the A/D converters 122 and 128 with the aid of a computer 131, the tooth gap deviations at the individual measuring steps can also be emitted via a recording device 132. If the value furnished by the computer 131 is again divided by the value 2 tan in the computer 133, then the recording device connected to the latter furnishes the value Y''.

Finally, by triggering the analog memory 121 with the aid of the feeler 69 in its position 69a, the tooth thickness deviation can be emitted via a computer 135 and a recording device 136.

As described in conjunction with FIG. 5, the various measured values are ascertained at a measuring position in which the feeler 69 is operative first in the position shown by a solid line and second by the position 69a shown in broken lines. In order to express the time difference in FIG. 5a as well, the control routes leading to the feeler position 69a are shown in broken lines.

With the testing apparatus shown in FIGS. 4 and 5, the spacing deviations for the left and right tooth flanks can be ascertained, as described, within one revolution of the test object, and the same is true for the deviations in tooth gaps and tooth thickness, without requiring a separate measuring apparatus for this purpose or another revolution on the part of the test object. It will now be described how, with the same testing operation, it is also possible to ascertain the deviations in gear concentricity with the aid of an appropriate computer unit connected with the measuring apparatus.

Figure 6:
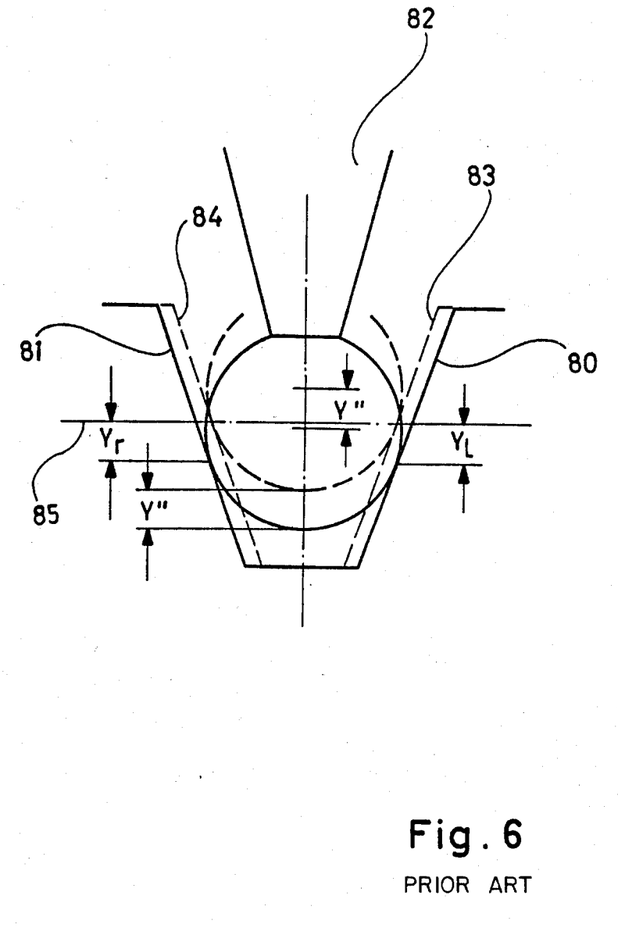
FIG. 6 is a schematic illustration of the measurement of tooth gap deviations, and thus of gear concentricity deviations, in the known manner.

First, the known method for ascertaining the gear concentricity deviation should be addressed once again. FIG. 6 shows a tooth gap having a left tooth flank 80 and a right tooth flank 81, into which a ball-like measuring feeler 82 has been inserted. In the present case, the tooth gap is assumed to be too wide in comparison with the desired tooth gap size, which is represented by the flanks 83 and 84 shown in dashed lines. The ball of the measuring feeler 82 is also dimensioned such that if the tooth gap is correct, it would come to rest on the tooth flank precisely at the level of the pitch circle 85.

However, since as noted the tooth gap is too wide in the present instance, the ball of the measuring feeler 82 moves more deeply into the tooth gap by the amount y'', which is ascertained and recorded in this manner as a measured value for the tooth gap deviation. Once the gear has made one complete revolution and each gap has been tested, then the difference between the smallest and the largest value of the curve recorded as a result of testing indicates the deviation in gear concentricity.

As is also seen from FIG. 6, the value y'' is made up of components $y_l$ and $y_r$; however, it should be noted that with these partial amounts as a basis, only half of each value should be taken into consideration. That is, if one were to assume that the error shown by way of example on the left flank 80 did not exist, then $y_l$ would equal zero, and only the $y_r$ component would appear. Yet in the case of an error-free tooth gap, the ball of the measuring feeler 82 would not penetrate the teeth by this amount, but instead would penetrate the gap only by half the amount of $y_r$.

Furthermore, these definitions are such that in the case of an excessively wide tooth gap, the amounts $y_r$ and $y_l$ are considered as positive values, while for an excessively narrow tooth gap, they are made to be negative.

The above discussion applies in corresponding fashion to the measurement of tooth thickness, for which a forked measuring feeler can be imagined as being placed against a tooth in such a manner that in the case of an error-free tooth the feeler touches its flanks at the pitch circle. Here again, the ascertainment of error is accomplished via the insertion depth of the forked feeler, and the only difference from what was described in connection with FIG. 6 is that the algebraic signs (+ or −) are reversed. If the tooth is thicker than desired, then there is an excess, and the forked feeler moves less deeply into the teeth, producing positive values of y'' and $y_l$ or $y_r$. If the tooth is too narrow, then these values become negative.

Figure 7:
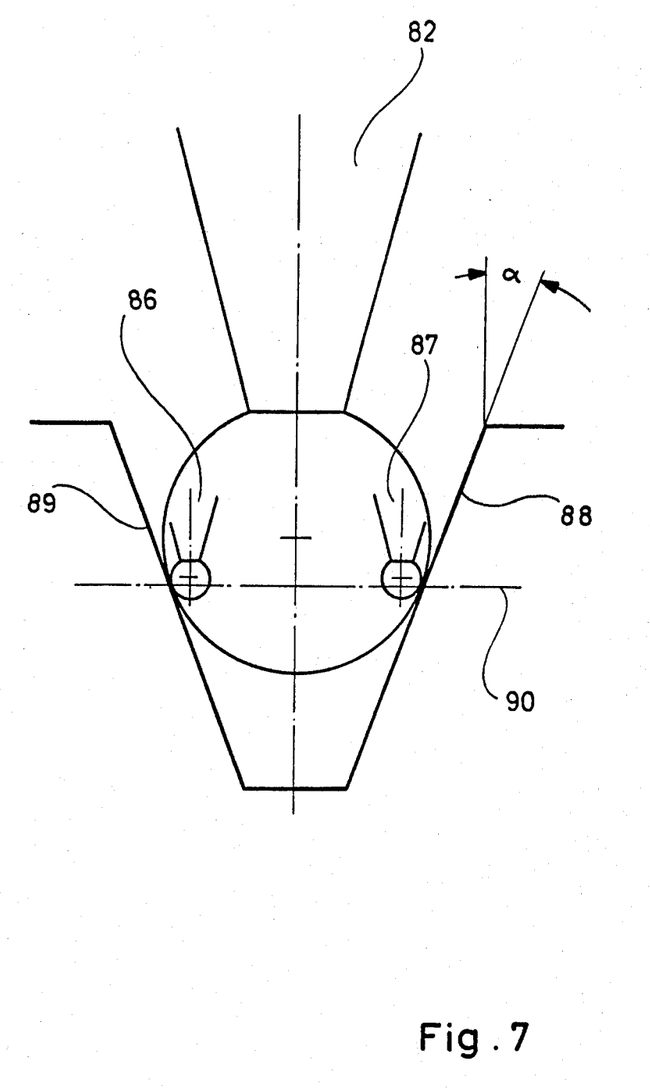
FIG. 7 schematically shows a comparison between the known ascertainment of concentricity and tooth gap deviations with the method for ascertaining these deviations according to the invention.

FIG. 7 now shows how the ball-like feeler 82 is replaced in accordance with the invention by two individual feelers 86 and 87, which are positioned on the testing apparatus such that in the case of the error-free tooth flanks 88 and 89 shown in FIG. 7, the feelers touch these flanks precisely on the pitch circle 90.

Figure 8:
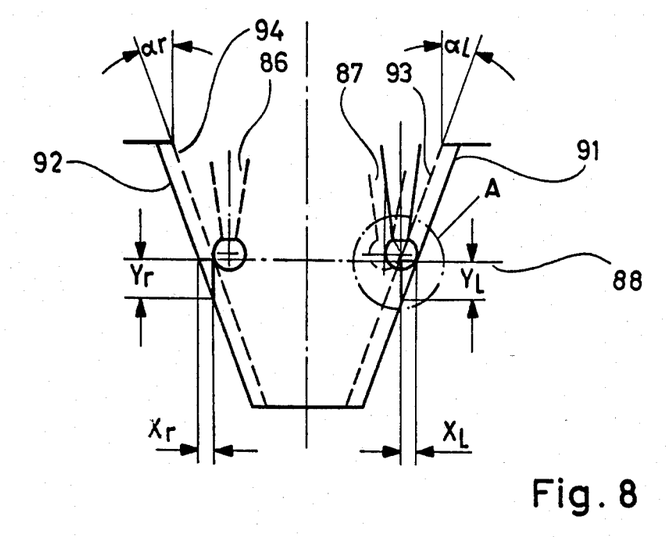
FIG. 8 is a schematic diagram explaining the method according to the invention for ascertaining deviations in gear concentricity and tooth gaps.

The known testing method shown in FIG. 6 will now be discussed once again in terms of the feelers 86 and 87, as shown in FIG. 8.

In FIG. 8, as in FIG. 6, the tooth gap is shown as being excessively large, as indicated by the flanks 91 and 92 drawn in solid lines. The error-free flanks are shown in dashed lines and numbered 93 and 94.

If these flanks are then scanned by two feelers 86 and 87, which are positioned on the pitch circle 90, then the feelers undergo a deflection movement $x_r$ and $x_l$ in the direction of the pitch circle, as compared with the error-free positioning indicated by the dashed lines. In other words, the feelers in this instance do not move into the tooth gap more deeply; instead, they contact the flanks at a position which is shifted in the circumferential direction by the amounts $x_r$ and $x_l$.

From these amounts $x_r$ and $x_l$, the values $y_r$ and $y_l$ can now be determined:

$$y_r = x_r/\tan \alpha, \text{ and } y_l = x_l/\tan \alpha.$$

Once the amounts $y_r$ and $y_l$ have thus been ascertained, then they must be divided in half as noted earlier, resulting in the values $$y'_r = y_r/2 \text{ and } y'_l = y_l/2.$$

From this, it can be determined that $$y'' = y'_r + y'_l.$$

In the above example, described in connection with FIG. 8, the amounts $y_r$ and $y_l$ are both positive, so that y'' is positive as well. Or if instead the solid flank lines of FIG. 8 were the error-free lines, while the dashed lines represented an excessively narrow tooth gap, then the amounts $y_r$ and $y_l$ would be negative, so that y'' would also be negative. Finally, if one flank were excessively large and the other excessively small, the result would be positive and negative amounts of y' to be added together.

Figure 9:
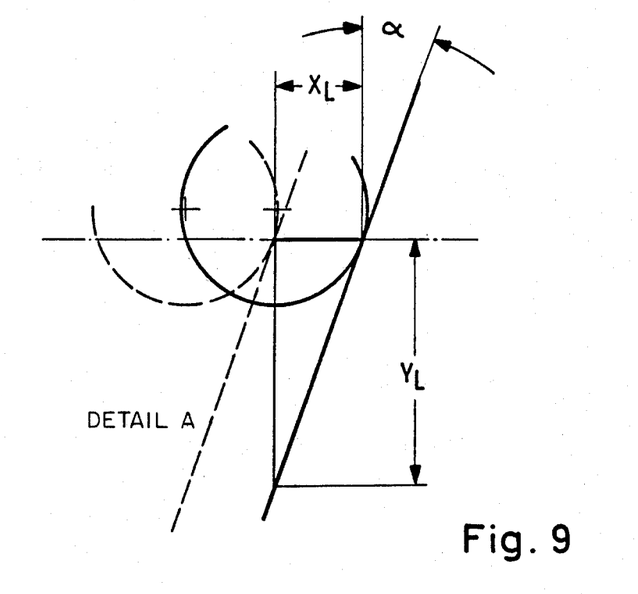
FIG. 9 shows a detail of FIG. 8.

FIG. 9, as Detail A of FIG. 8, once again shows, more clearly, the relationship between the amounts $x_1$ and $y_1$ as a function of the angle of insertion $\alpha$.

The relationships discussed above in terms of the testing of tooth gaps, which also determines the gear concentricity deviation, also applies to the testing of the tooth thickness; however, in the latter case then the algebraic sign is reversed in terms of the insertion depth.

In this manner, it is possible to use the test apparatuses explained in connection with FIGS. 4 and 5 also for ascertaining gear concentricity deviations, tooth thickness deviations and tooth gap deviations. All that is necessary is for the values furnished by the various measuring feelers to be further processed or prepared in the described manner, with the aid of a computer, before the values are emitted.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An automatic testing apparatus for testing the circumferential spacing of gear teeth of a gear caused to rotate continuously in one direction comprising,
    a slide displaceably mounted on a frame,
    a drive means for radially moving said slide toward and away from said gear between adjustable stops for a testing operation,
    first and second measuring feelers pivotably supported on said slide and each having a transducer means for sensing a measurement position value,
    means for placing said feelers in contact with identical tooth flanks of said gear teeth in the vicinity of a pitch circle of said gear under the influence of a spring force when said feelers have been inserted into tooth spaces of said gear teeth by said slide and for raising said feelers from said tooth flanks counter to said spring force after a testing operation has been performed,
    switching means connected to said first measuring feeler for transmitting the measurement value measured by said second measuring feeler for a specified pivoted position of said first feeler,
    control means responsive to said switching means for operating said drive means to retract said feelers away from said gear teeth and reinsert said feelers into said gear teeth, and
    a third measuring feeler having a transducer means for sensing a measurement position value disposed on said slide and positioned in the vicinity of the pitch circle of said gear pointing toward a tooth flank located opposite one of said first and second measuring feelers, and said switching means transmitting the measurement value measured by said third feeler for a specified pivoted position of said first feeler.

2. A testing apparatus as defined by claim 1, wherein said third measuring feeler is disposed between said first and second feelers for measuring a deviation in thickness of a tooth associated with said third feeler and said first feeler and for measuring a tooth space deviation of a tooth space associated with said third feeler and said second feeler, and a memory and computer means connected with said feelers for storing the deviation in tooth space of one measuring step and adding said deviation with a tooth thickness deviation of a subsequent measuring step, whereby the spacing deviation for the left and right flanks located opposite said first and second feelers can be ascertained.

3. A testing apparatus as defined by claim 1, wherein said third feeler is located in a tooth space associated with one of said first and second feelers and is in contact with a tooth flank located opposite said one of said feelers, and the other of said first and second feelers is disposed on a slide displaceable substantially at a tangent to said gear, whereby said other feeler can be shifted for an individual measuring operation from one tooth flank to the opposite tooth flank for a given tooth space.

4. A testing apparatus as defined by claim 3, wherein said shiftable other feeler is a reference feeler and defines a reference value for a pickup of a measurement value of said first and second feelers for each of two indexing positions of said slide.

5. A method for testing the circumferential spacing of gear teeth of a rotatable gear, in which a plurality of measuring feelers contacting flanks of adjacent teeth in the vicinity of the pitch circle, of said gear measure spacing deviations which are stored in a memory and then transmitted in comparison with a reference value effected by at least one of said feelers during a measurement operation, comprising the steps of,
    circumferentially shifting said gear by a single gear tooth space between each measurement operation,
    retracting said feelers from and reinserting said feelers into the teeth of said gear for each single space shifting of said gear, and
    during a single measurement revolution in one direction of said gear measuring the spacing deviations of the right and left flanks of adjacent tooth spaces, tooth thickness deviations, and tooth space deviations in said gear.

6. A method as defined by claim 5, wherein during a first measurement operation, the tooth space width between a first and second tooth is measured and stored in said memory, and during a subsequent measuring operation, a tooth thickness of said second tooth is measured and the thickness of said second tooth to the space width between said first and second teeth is added, whereby a spacing deviation of flanks of said first and second teeth is ascertained.

7. A method as defined by claim 5, wherein two spacing deviations in one measurement operation are measured one after the other by switching over one of said measuring feelers located in one tooth space from one side to the other side of said tooth space.

8. A method for measuring the deviations in gear concentricity, tooth thickness and tooth spaces in a rotatable gear, in which the tooth spaces are scanned by measuring feelers, and the deviations with respect to a reference value of said measuring feelers effected in a measurement operation are ascertained, stored and then transmitted, comprising the steps of,
    circumferentially shifting said gear by a single tooth space for each measurement operation,
    retracting said feelers from and reinserting said feelers into said teeth between each measurement operation,
    separately measuring each side of the tooth space in the vicinity of a pitch circle of said gear,
    adding the resultant deviations in a circumferential direction of said gear from said reference value from two measuring feelers associated with said tooth space,
dividing said addition by a tangent of the angle of insertion of said feelers into said tooth space and further dividing the result thereof in half,
transmitting the measurement value thus effected in said measurement operation, whereby a feeler deviation resulting from an excessive dimension on the part of said tooth space can be further processed in the form of a positive value for determining tooth space deviation and gear concentricity deviation.

* * * * *